Figure 1:
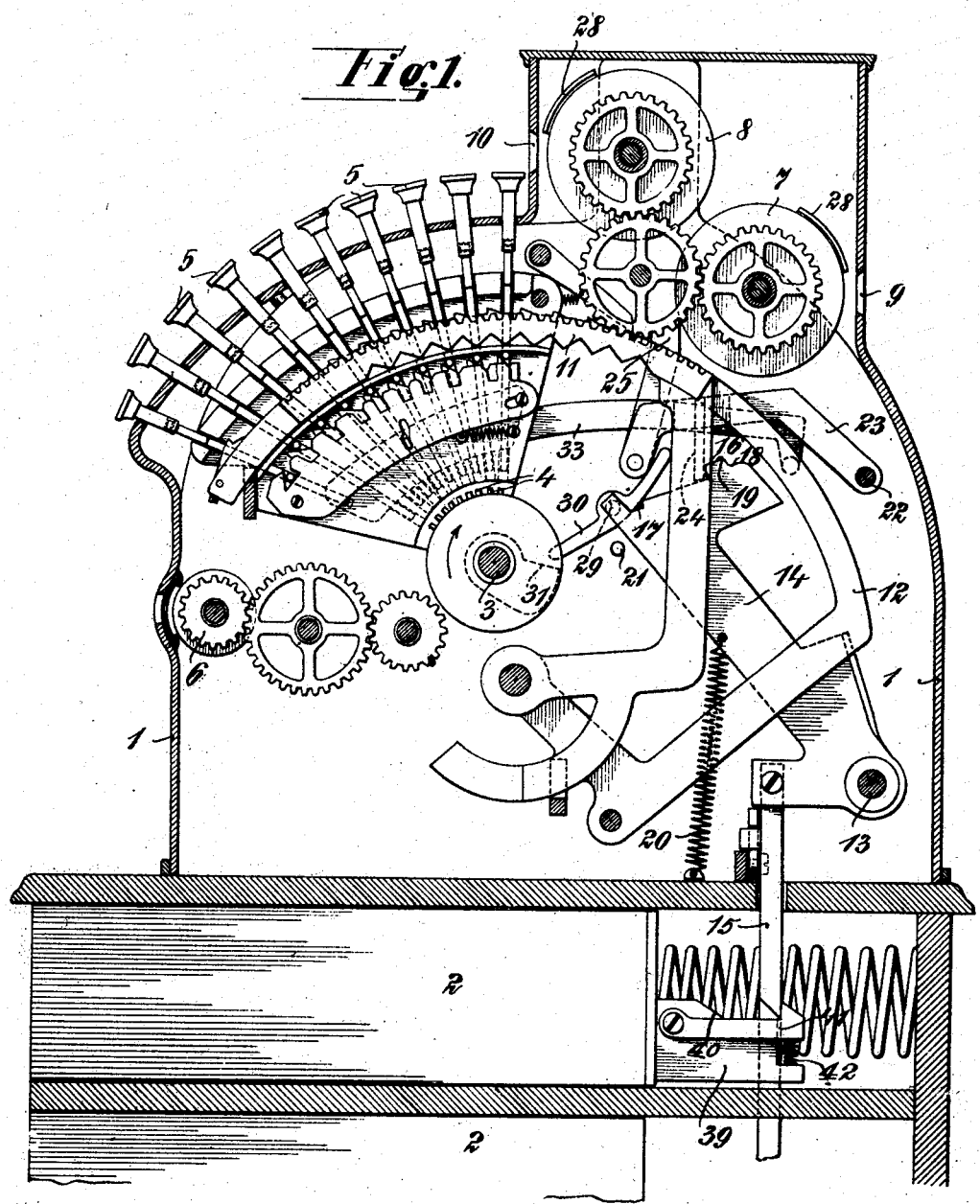

W. R. HEINITZ.
CASH REGISTER.
APPLICATION FILED APR. 28, 1908.

1,134,195.

Patented Apr. 6, 1915.
9 SHEETS—SHEET 1.

W. R. HEINITZ.
CASH REGISTER.
APPLICATION FILED APR. 28, 1908.

1,134,195.

Patented Apr. 6, 1915.
9 SHEETS—SHEET 3.

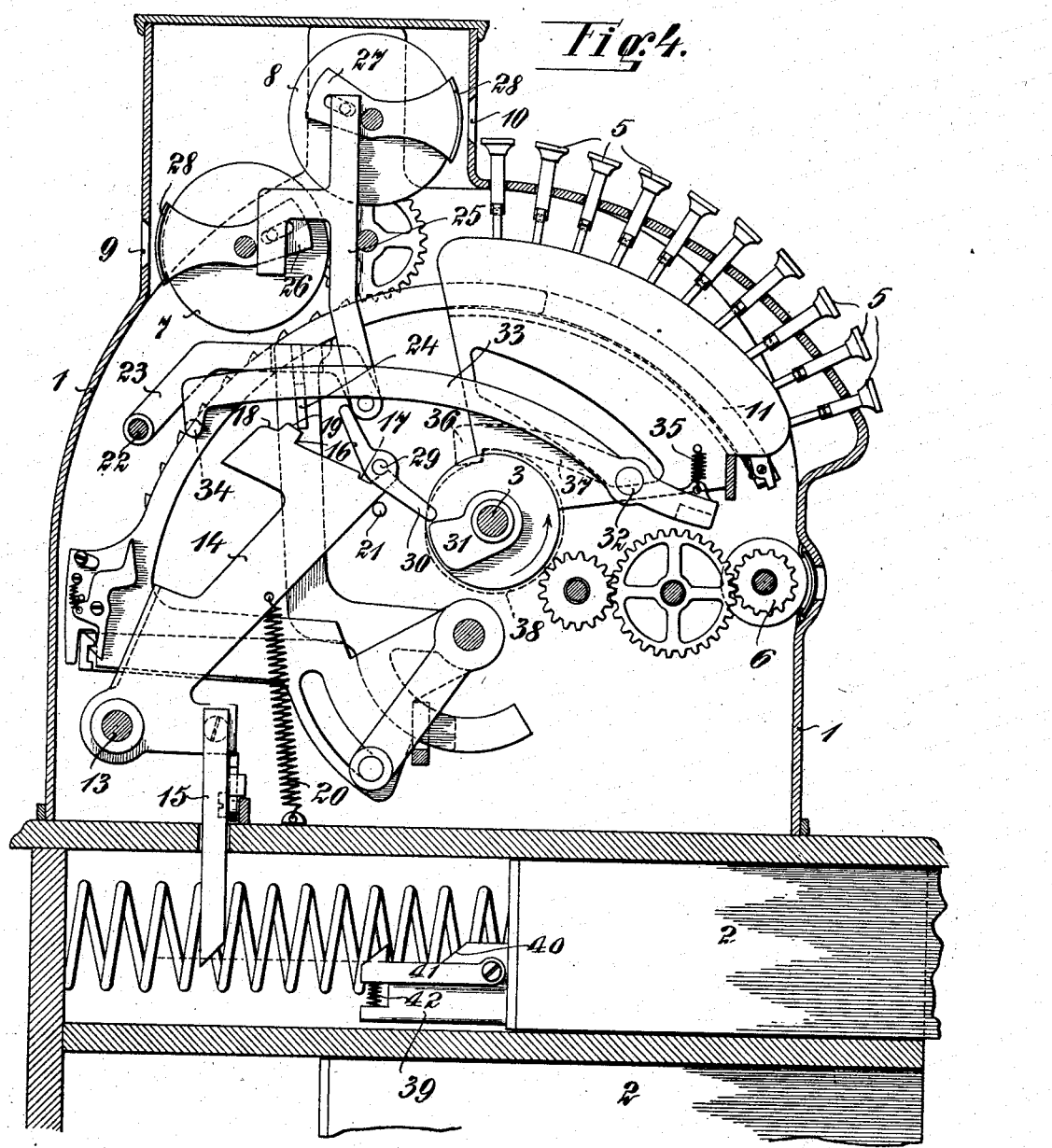

W. R. HEINITZ.
CASH REGISTER.
APPLICATION FILED APR. 28, 1908.
1,134,195.
Patented Apr. 6, 1915.
9 SHEETS—SHEET 5.
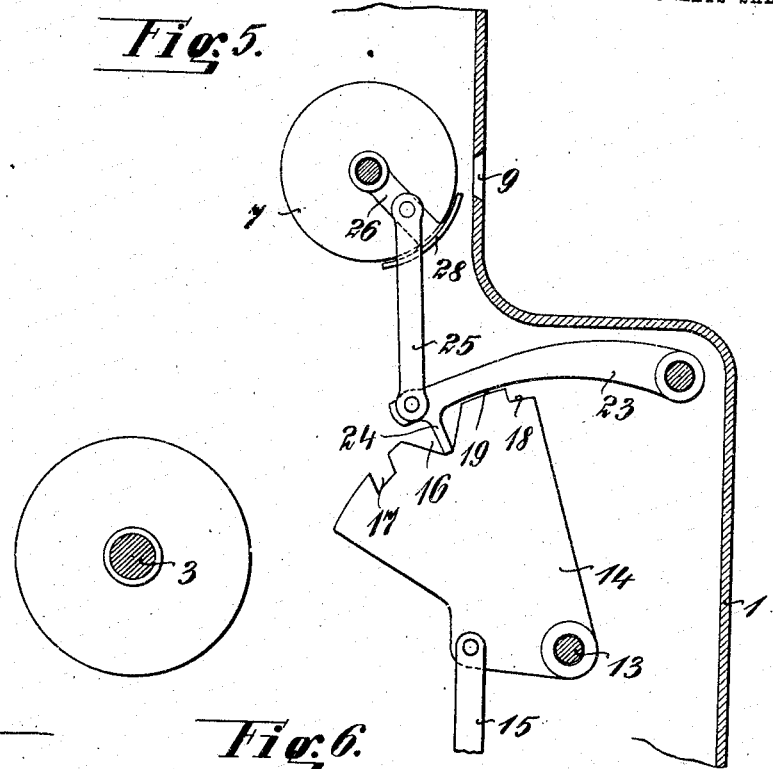
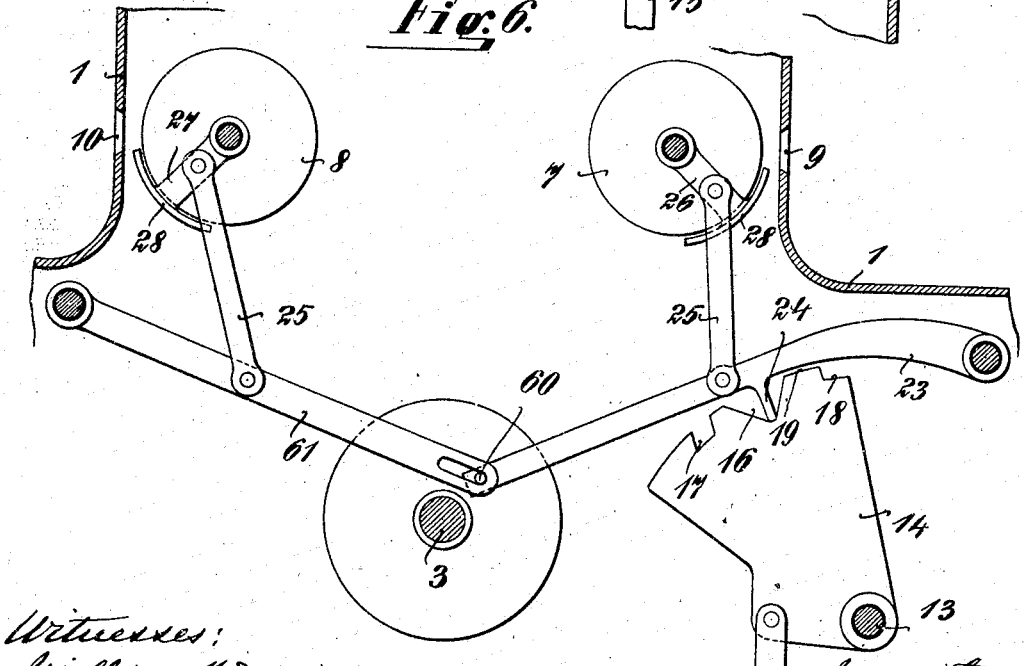

W. R. HEINITZ.
CASH REGISTER.
APPLICATION FILED APR. 28, 1908.
1,134,195.
Patented Apr. 6, 1915.
9 SHEETS—SHEET 6.
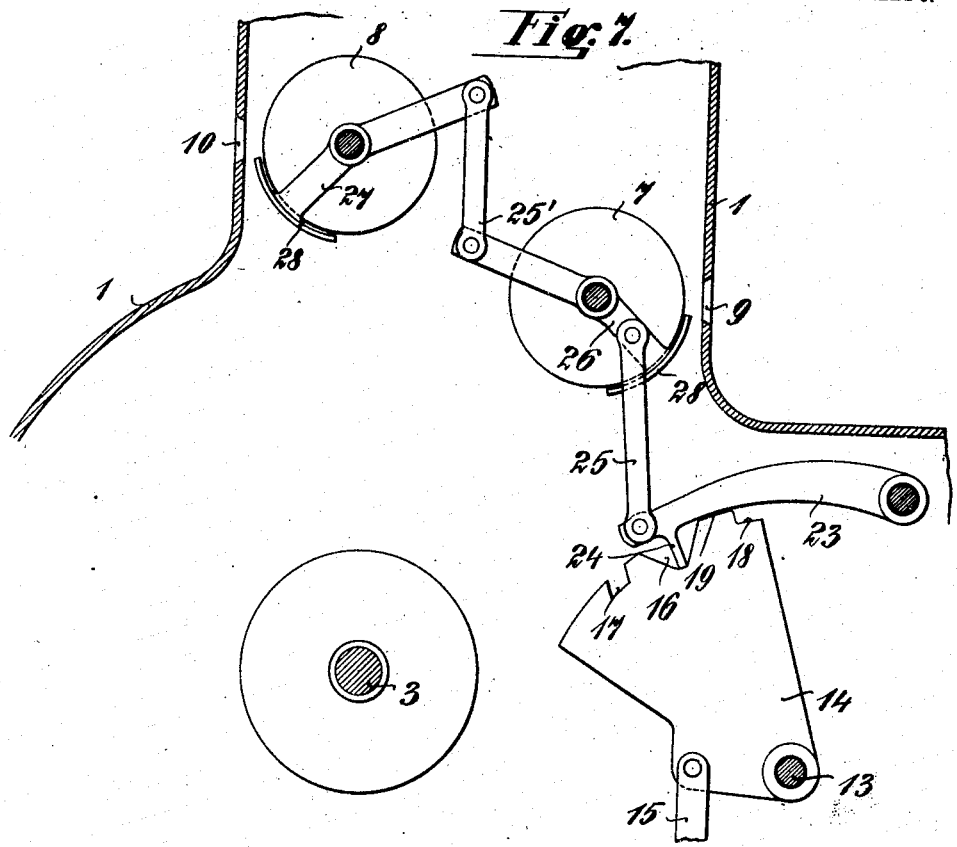
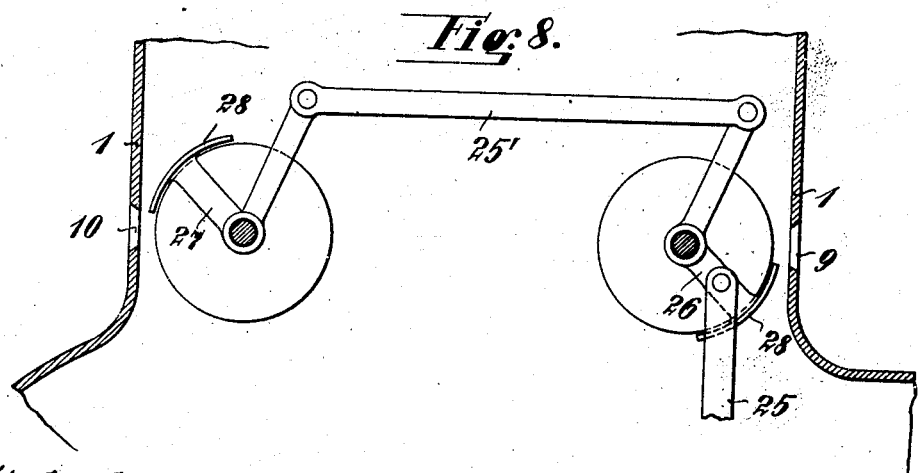

W. R. HEINITZ.
CASH REGISTER.
APPLICATION FILED APR. 28, 1908.

1,134,195.

Patented Apr. 6, 1915.
9 SHEETS—SHEET 7.

W. R. HEINITZ.
CASH REGISTER.
APPLICATION FILED APR. 28, 1908.

1,134,195.

Patented Apr. 6, 1915.
9 SHEETS—SHEET 8.

Witnesses:
William A Davis
L. H. Barlow.

Inventor:
W. R. Heinitz,
by Lennie & Goldsborough
Attorneys

W. R. HEINITZ.
CASH REGISTER.
APPLICATION FILED APR. 28, 1908.

1,134,195.

Patented Apr. 6, 1915.
9 SHEETS—SHEET 9.

Witnesses:

Inventor:

UNITED STATES PATENT OFFICE.

WOLDEMAR REINHOLD HEINITZ, OF CHEMNITZ, GERMANY, ASSIGNOR, BY MESNE ASSIGNMENTS, TO THE NATIONAL CASH REGISTER COMPANY, A CORPORATION OF OHIO, (INCORPORATED IN 1906.)

CASH-REGISTER.

1,134,195.      Specification of Letters Patent.      Patented Apr. 6, 1915.

Application filed April 28, 1908. Serial No. 429,651.

*To all whom it may concern:*

Be it known that I, WOLDEMAR REINHOLD HEINITZ, a citizen of the Kingdom of Saxony, Empire of Germany, and resident of Chemnitz, Germany, (whose post-office address is Neefestrasse 24,) have invented certain new and useful Improvements in Cash-Registers, of which the following is a specification.

This invention relates to cash registers and the principal object thereof is to provide mechanism for compelling a certain sequence of operation of a plurality of instrumentalities embodied in a cash register in order to complete the entering of a transaction therein. In the specific embodiment of the invention a normally locked operating mechanism is provided, which mechanism is unlocked by the movement of the cash receptacle preparatory to the opening thereof, and after the receptacle has been opened it is impossible to close said receptacle until the operating mechanism is operated. By the movement of the cash receptacle to release the operating mechanism a concealing means for the indicator mechanism is enabled, which concealing means is disabled only by the latching of the cash receptacle in a closed or inaccessible position.

Another object of this invention is to provide mechanism for locking one or more cash receptacles in a closed or inaccessible position, which locking mechanism is entirely disabled by the movement of the cash receptacle.

Another object of this invention is to provide mechanism for rendering the main operating mechanism of the machine inoperative, which mechanism is disabled by the movement of a cash receptacle. The mechanism for rendering the main operating mechanism inoperative is disabled by the inward movement of the cash receptacle, and it is another object of the invention to provide mechanism for temporarily arresting the cash receptacle in its inward movement at the completion of the entering of a transaction so as not to disable the mechanism for rendering the main operating mechanism inoperative until it is desired to enter another transaction in the machine. As the cash receptacle is rendered accessible before the operation of the machine proper, certain indicating devices are brought into play if the machine proper is not operated in a predetermined length of time after the cash receptacle is rendered accessible. This is to prevent a fraudulent manipulation of the machine, as otherwise a dishonest clerk may open the cash receptacle and deposit the amount of the transaction and after the customer has departed, enter upon the machine a less amount than that paid by the customer. With the improved indicating devices, if the clerk does not immediately enter the transaction upon the machine proper after opening the cash receptacle, an alarm would be sounded notifying the other attendants in the store that the machine has not been properly operated. A permanent indicating mechanism in the form of a registering device will also be operated, by which device the proprietor of the store is enabled to ascertain the number of times the machine has been improperly operated.

Another object is to provide concealing means for the indicators under the control of the cash receptacle, which means is brought into operative position by the opening of the cash receptacle and rendered inoperative upon the latching of the cash receptacle in a closed position.

A further object of this invention is to construct the concealing means covering the indicators on the clerk's side of the machine with transparent material so that by close observation the amount on the indicators beneath the concealing means may be observed by the clerk before the transaction is completely entered in the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
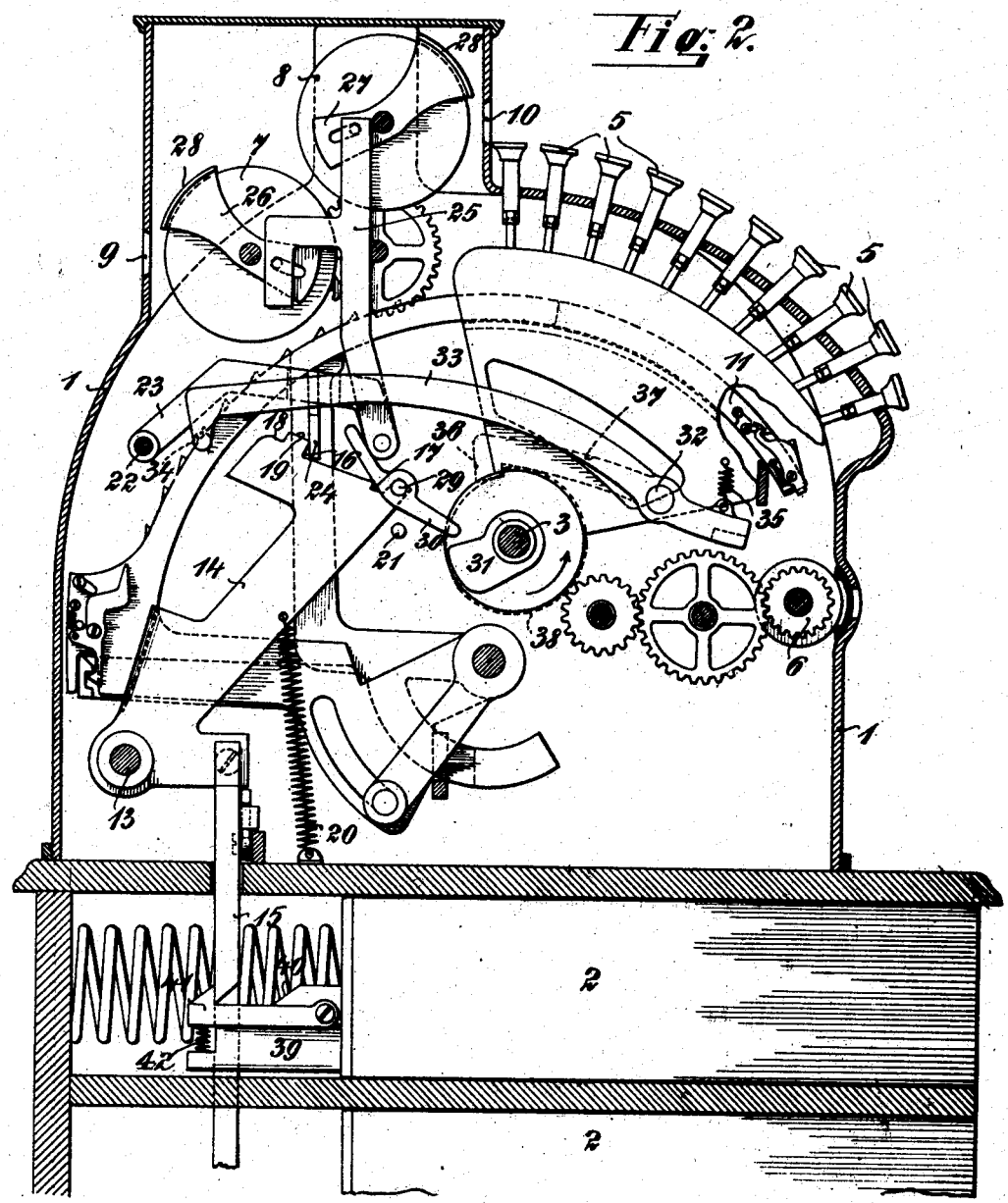
Figure 3:
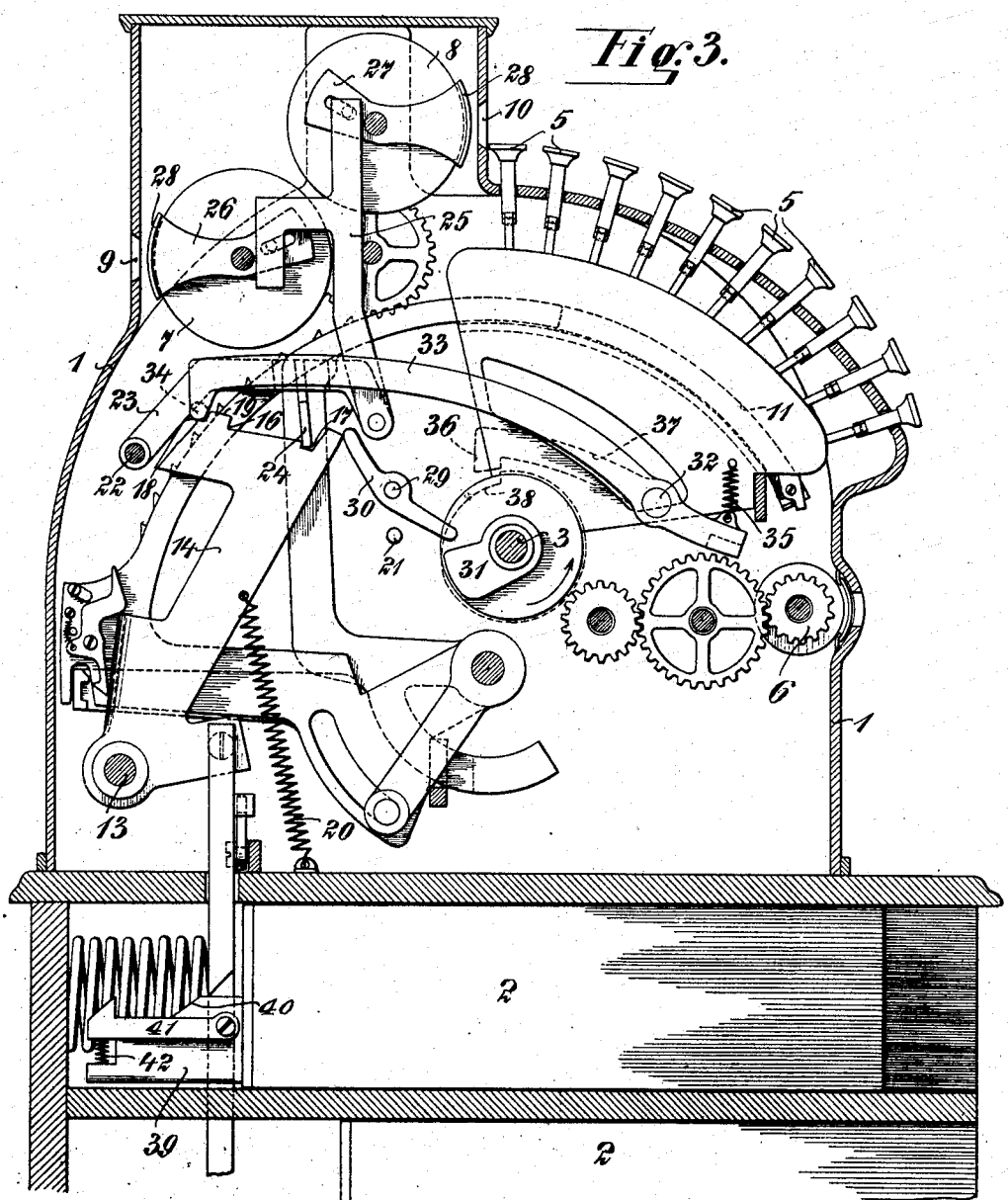
Figure 9:
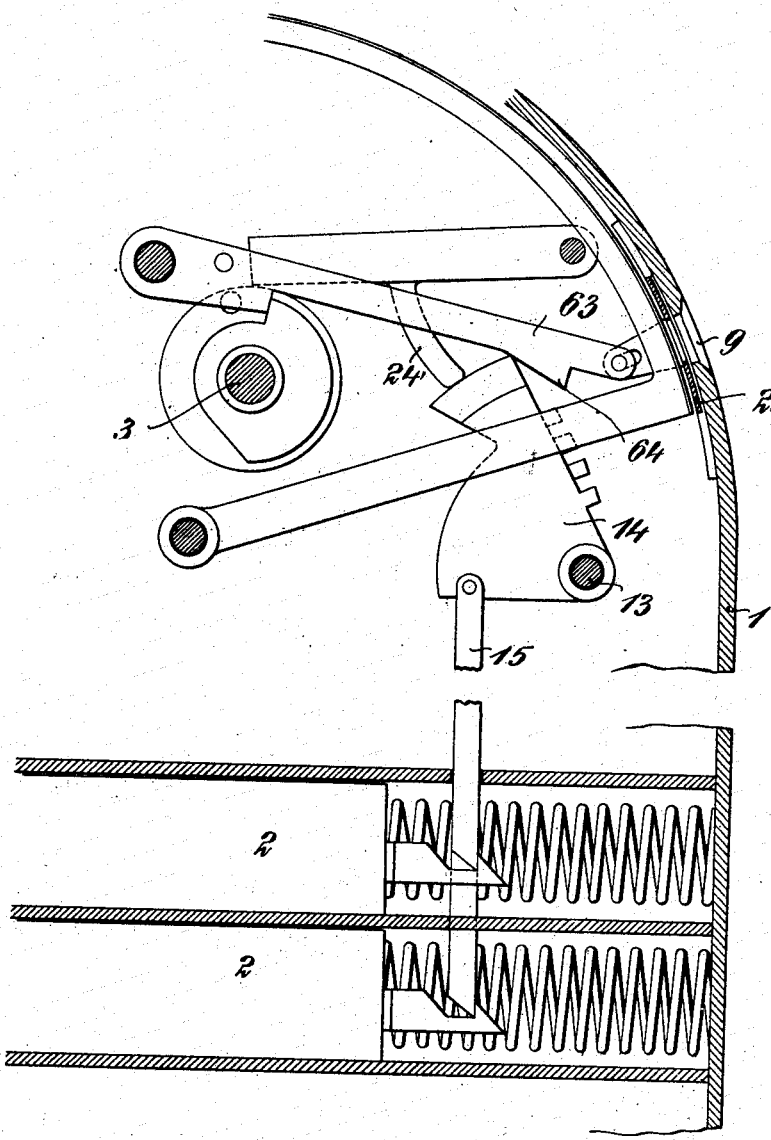
Figure 10:
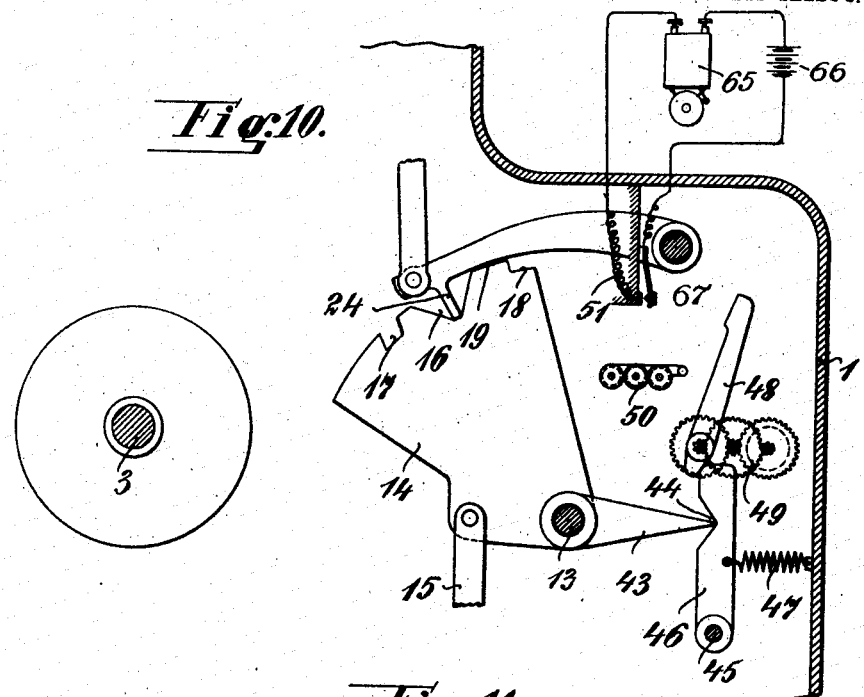
Figure 11:
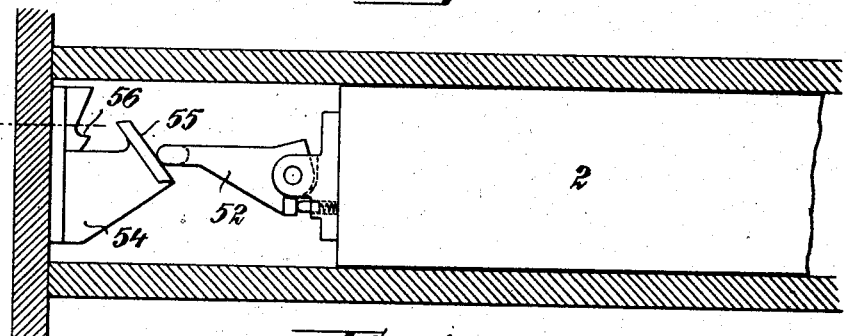
Figure 12:
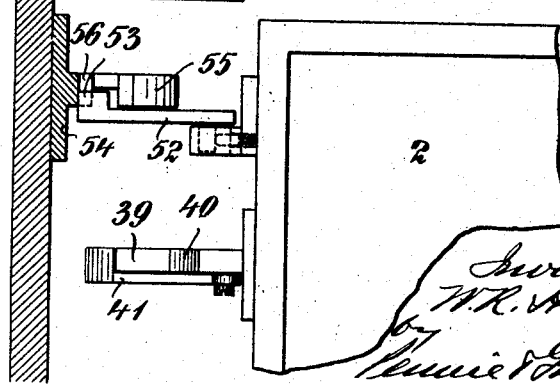
Figure 13:
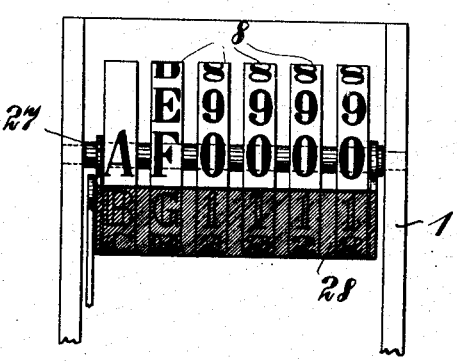
Figure 14:
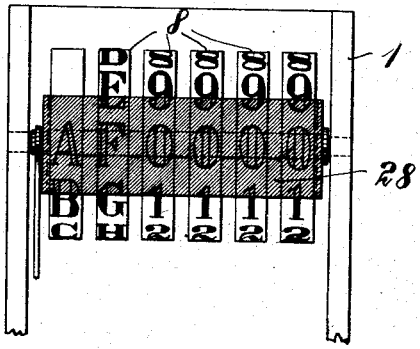

Figure 1 is a vertical cross-section of the cash register with its parts in their position of rest, and seen from the right. Fig. 2 is a similar view of the cash register seen from the left, also showing the parts in their positions of rest. Fig. 3 is a view similar to Fig. 2 showing the parts in their position after pushing in a till. Fig. 4 is a similar view showing the parts in their positions after pulling out a till. Fig. 5 is a diagrammatic view illustrating a modification of the shutter for the indicators. Figs. 6 to 8 are diagrammatic views illustrating further modifications of the shutter operating mechanism. Fig. 9 is a diagrammatic view of of a modification of the indicating mechanism, the indicator wheels being replaced by segments. Fig. 10 is a detail view illustrating means for indicating when the mechanism is not properly operated. Fig. 11 is a detail view showing a side view of locking means for preventing the till from being immediately pushed in again beyond its position of rest. Fig. 12 is a plan of Fig. 11, and Figs. 13 and 14 are side views showing in a conventional way a transparent shutter.

For the sake of illustration this invention has been shown to a machine of the type described in United States Letters Patent No. 875,075 granted to the present applicant December 31st, 1907, a general description only of which will be given.

The machine proper is inclosed in a casing 1, which is mounted upon the cabinet containing a plurality of cash tills or receptacles 2. A main operating shaft 3 is provided and upon this shaft are secured a series of adjusting wheels 4 adapted to be set by keys 5 and transfer the amount represented by the depressed keys to the registering mechanism 6 and to the indicators 7 and 8, which are observed by the customers and clerks respectively through openings 9 and 10 in the casing 1. These indicators are driven by differentially movable segments 11, which, in turn, are driven by elements 12 having a constant movement, as fully shown and described in the above mentioned patent to which reference may be had for a detailed description of the operation of the above enumerated parts.

The first feature of the invention to be described relates to the mechanism by which the cash receptacles are unlocked by the movement of the receptacle itself and thus distinguishing from United States Letters Patent No. 858,982 granted to the present applicant July 2nd, 1907, wherein there is disclosed a latching mechanism for the different receptacles, which is positioned by the movement of the receptacle so as to be released by the operation of the main operating mechanism of the machine.

Above the cabinet containing the cash receptacles 2, and near the rear of the machine, is located a transverse shaft 13 upon which a plurality of levers 14 are mounted. Extending downwardly from each of these levers 14, of which there is one for each one of the cash drawers 2, is a plunger 15 which coöperates with a latch 41 carried by a plate 39 secured to the rear of each one of the cash receptacles. Each of the plates 39 has two horizontal bearing surfaces connected by a bevel face 40. The lower one of these bearing surfaces is in horizontal alinement with the upper surface of the latch 41 secured to the plate 39. The latches 41 carried by the different plates 39 are normally held in the position shown in the drawings by springs 42 interposed between the latches and tails formed on the plates 39. Upon the rearward movement of any one of the cash receptacles 2 the bevel face 40 of the plate 39, carried by said receptacle, will elevate the plunger 15 coöperating therewith and thereby rock the lever 14, to which the plunger 15 is secured, into the position shown in Fig. 3. Each of the plates 14 at its upper edge is provided with shoulders 16 and 17 and bearing surfaces 18 and 19. When any one of the levers 14 is rocked by the inward movement of its coöperating cash receptacle 2, as above described, a cross rod 24, supported by a lever 23, will engage with the shoulder 17 of the lever 14 and hold said lever in its adjusted position, as shown in Fig. 3, against the tension of its spring 20. The lever 23 is pivotally mounted upon a transverse shaft 22 and at its forward end is connected to the lower end of a link 25, which is suitably connected to arms 26 and 27 mounted on the shafts supporting the previously described indicators 7 and 8. The arms 26 and 27 are duplicated on either end of the shafts of the indicator wheels and they are connected with each other by plates 28 located between the indicators 7 and 8 and the openings 9 and 10 formed in the cabinet 1 of the machine. These side arms 26 and 27 and plates 28, form the means for concealing the indicators from view while the machine is being operated to enter a transaction therein. As shown in Fig. 1 this concealing means is normally withdrawn from between the indicators and the openings in the cabinet so that the amount on said indicators in alinement with the openings in the cabinet may be observed readily by the customers and clerks. With the plate 14 latched in its position as shown in Fig. 3 of the drawings, it will be observed that the plunger 15 projecting downwardly from said plate is above the plane of movement of the upper edge of the latch 41 carried by the plate 39 secured to the uppermost one of the cash receptacles 2, in which position of the plunger 15, the cash receptacle may be ejected by its spring without said plunger interfering with the latch 41. From this it is apparent that the latching mechanism for the cash receptacle is disabled entirely by the movement of the cash receptacle itself, this latching movement being held in its disabled position until released by the operation of the main operating mechanism in a manner presently to be described.

The main shaft 3 of the machine is normally prevented from being rotated by a hook portion 36 of an arm 37, which hook portion engages with a shoulder formed upon a disk 38 secured to the shaft 3, as shown in Fig. 2. This arm 37 is secured to a stub shaft 32 projecting from one of the side frames, which shaft also has secured thereto a lever 33 extending rearwardly therefrom, which lever at its rear end is provided with a laterally extending rod 34. This rod 34 projects in the rear of all of the levers 14 and when one of said levers is rocked, by the inward movement of its respective cash receptacle, the rod 34 will ride upon the bearing surface 18 of the operated lever 14, as shown in Fig. 2 of the drawings. By thus riding upon the bearing surface 18 the lever 33 will be rocked against the tension of its spring 35. This rocking of the lever, will, through the stub shaft 32, elevate the hook portion 36 of the arm 37 from engagement with the shoulder of the disk 38, thus freeing the main operating shaft 3. Upon turning the shaft 3 by a crank handle, not shown, or other suitable driving device, the wheels 4 secured to said shaft will actuate the registering mechanism 6 to an extent determined by keys 5 depressed, and the amount registered will be set up on the indicators 7 and 8 through the differentially movable segments 11. Near the end of rotation of the shaft 3 a cam 31 (Fig. 3) secured thereto will engage with one end of a lever 30, which is centrally pivoted as at 29 to the frame work of the machine, and rock said lever in a clockwise direction. When thus rocked the other end of the lever 30 will engage with the forward end of the arm 23 and rock said arm in an anti-clockwise direction, raising the bar 24 carried by the arm from engagement with the shoulder 17 of the previously operated plate 14, which plate will immediately be rocked in a clockwise direction by its spring 20 until arrested by a rod 21 projecting from one of the side frames of the machine, as shown in Fig. 4. This restoration of the plate 14 occurs before the cam 31 passes free of the lever 30 so that when the latter is freed by said cam the bar 24 carried by the lever 23 will drop into contact with the bearing surface 19 of the plate 14, in which position it is shown in Fig. 4. By reference to this figure it will be noted that the shutters 28 of the concealing means for the indicator are interposed between said indicators and the openings in the cabinet, in which position the said shutters remain until the open cash drawer is closed. Upon the closing of the cash drawer receptacle the plunger 15 coöperating therewith will be slightly raised until it rests upon the lower horizontal bearing surface of the plate 39 secured to the rear of the cash drawer, the plane of which bearing surface is indicated by the dotted line in Fig. 4. This slight elevation of the plunger 15 will impart a slight movement in an anti-clockwise direction to the plate 14, which movement will permit the bar 24 to drop in front of the shoulder 16 formed upon said plate, as shown in Figs. 1 and 2. This lowering of the plate 24 carried by the lever 23 will also lower the slide 25 connecting said lever 23 with the arms 26 and 27 of the previously described concealing means, which movement of the link will rock the arms 26 and 27 so as to carry the shutters 28 into the position shown in Figs. 1 and 2. It will be noted that the notch formed by the shoulder 17 in each of the plates 14 is of a greater radius than the notch formed by the shoulder 16, from which it will be seen that when the bar 24 carried by the lever 23 passes into engagement with the shoulder 17, the shutters 28 will be held in concealing position, as shown in Fig. 3, while the said shutters will be withdrawn from concealing position when the bar 24 engages with the shoulder 16 of either of the plates 14, in which position the said bar is shown in Figs. 1 and 2.

From this description it will be seen that as long as the plate 14 coöperating with any of the cash receptacles is held in the position shown in Fig. 3, in which position it is held until the main operating shaft 3 is rotated, it will be impossible to latch the cash drawer in a closed position and furthermore, it will be seen that the concealing means is not withdrawn after it has been moved to concealing position by the opening of one of the cash receptacles until the main shaft is operated and the open cash drawer closed.

As the movement of the shutters 28 to a concealing position and the release of the main shaft 3 is controlled by the last increment of movement inwardly of any of the cash receptacles, suitable mechanism is provided for momentarily arresting the inward movement of the cash receptacle previous to their last increment of movement so as to avoid the possibility of accidentally releasing the main operating shaft and moving the shutters to a concealing position, which mechanism will now be described.

Each of the tills or cash receptacles 2 has suitably attached to the rear thereof, Figs. 11 and 12, a pivoted block 52 having a lateral offset 53, which, as the cash receptacle is being closed, rides up an inclined surface 55 of a plate 54 secured to the rear wall of the cabinet containing the multiple receptacles. As the offset 53 passes above the bearing surface 55 and to the rear thereof, it will come into contact with the hook portion 56 of the plate 54 and thereby prevent further inward movement of the cash receptacle. As said receptacle is relieved of pressure its ejecting spring will force it slightly forward until it is arrested by the latch 41 carried by the block 39 secured to the receptacle as shown in Fig. 1. In this position the offset 53 of the block 52 passes below the hook portion 56, when the cash receptacle is moved inwardly to operate the concealing means for the indicators and the locking mechanism for the main operating shaft. As the cash receptacle is opened the offset 53 bears on the underside of the surface 55 and the block 52 carrying said offset is rocked in a counter clockwise direction against the tension of a spring operated plunger supported upon the rear of the cash receptacle, and which plunger restores said block to its normal position (Fig. 11) when the offset 53 is free of the bearing surface 55.

It frequently happens that dishonest employees will place the amount tendered in the cash receptacle and after returning the change to the customer, will register a less amount than the amount purchased, or will operate the machine without registering anything, as the customer having departed, there is not much chance of detection, and it is one of the objects of this invention to provide mechanism for temporarily and permanently indicating if the machine is not completely operated in a predetermined length of time, which time is sufficient to make any desired registration upon the machine if no fraudulent manipulation were attempted, and the mechanism for accomplishing this purpose is as follows: Each of the plates 14 is provided with a rearward extension 43 (Fig. 10) which normally projects into a V shaped notch 44 of a lever 46 mounted upon a transverse rod 45, each of said levers being normally held in the position shown in said figure by a stout compression spring 47. Upon the inward movement of one of the cash receptacles its coöperating plate 14 will be rocked in a clockwise direction (Fig. 10) until the bar 24 engages with the shoulder 17 formed in said plate. This rocking of the plate 14, through extension 43, will rock the lever 46 against the tension of the spring 47 and thus free an arm 48 carried by one of a series of gears 49, which are driven by suitable motor, such as, for example, the motor spring of a clock. Upon the operation of the main shaft 3 the plate 14 will be rocked in a counter clockwise direction (Figs. 1 and 10) by its spring 20 when the bar 24 is elevated by the cam 31 carried by the shaft 3 and the intervening mechanism shown in Figs. 1 and 3. When the bar 24 is withdrawn from the shoulder 17, the plate 14 will be moved until arrested by the rod 21 shown in Fig. 4, in which position the bar 24 when released will rest upon the bearing surface 19 of the plate 14. In this position of the plate 14 the extension 43 of said plate will present itself to the deepest portion of the V shaped notch 44 at which time the spring 48 will return the arm or lever 46 to the position shown in Fig. 10, thereby restoring the lever 48 against the tension of its motor spring.

If the main operating mechanism of the machine were not operated within a certain length of time after the opening of the cash receptacle the arm 48 would be rotated in a counter clockwise direction by its spring to such an extent as to operate the switch 67 of a circuit 51 and thereby complete said circuit through the battery 66 and the alarm 65. This movement of the arm will also actuate a step by step counter 50 shown in a conventional way in Fig. 10 of the drawings.

The alarm mechanism forms only a temporary indication that the machine has not been properly operated, which indication can be destroyed by the rotation of the shaft 3, and if the proprietor were not present at the time of such improper operation of the machine he would not know of such misoperation and therefore a permanent indicating means in the form of the counter 50 is provided, access to which is only had by the proprietor. The counter 50 may be any of the well known step by step counters and as these counters are well known in the art, no further description or illustration is thought to be necessary.

It is a desirable feature of all cash registers and accounting machines quickly to see the amount to be registered without the necessity of perusing the keyboard for the purpose of detecting any possible error in the manipulation of said keyboard and also for guidance in making change, and to accomplish this purpose auxiliary indicators have been provided in some instances. By the use of a shutter through which the indicators may be observed by the attendant operating the machine, but not at a distance, the need of auxiliary indicators is done away with, which shutter, for example, may be made of transparent colored glass as shown in a conventional way in Figs. 13 and 14 of the drawings.

By the above described safeguards it will be apparent that any one of a plurality of cash receptacles may be rendered accessible without the necessity of an operation of the machine, and yet after the receptacle has been rendered accessible an operation of the machine is required before the said receptacle can again be closed, and if the receptacle is left open longer than required to complete a transaction for the purpose of fraudulently operating the machine, devices are brought into play to indicate such misoperation.

Various modifications are shown in Figs. 5 to 8 inclusive of mechanism for operating the shutters 28 comprising the concealing means. In Fig. 5 mechanism is shown for operating a single shutter 28, while in Fig. 6 two shutters are provided, the shutter for the indicators 7 being operated in the same manner, as that shown in Fig. 5, while the shutter 28 for the indicators 8 is operated from a pin 60 secured to a forward extension of the lever 23 which engages in a slot of a lever 61 connected to the arm 27 by the link 25. In the modification illustrated in Fig. 7 the lever 28 is actuated from the rearward extension of the lever 26 through a link 25'. The example shown in Fig. 8 differs from that illustrated in Fig. 7 by having the shutters moving in opposite directions. Accordingly the link 25' and the horizontal extension of the levers 26 and 27 are arranged as shown.

In the modification shown in Figs. 5, 6 and 7, and also in Fig. 10, the segment 14 and parts associated therewith are slightly different in design from the corresponding parts shown in Figs. 1 to 4 inclusive, while the operation of said parts is the same.

In the modification shown in Fig. 9 segments are employed instead of the wheels 7 and 8 for indicating the amount of the transaction. Upon the inward movement of the cash receptacle the plate 14 is rocked in a clockwise direction and is held in its adjusted position by an arm 24' which passes in front of the shoulder formed upon said plate. This plate 14 during the rocking thereof will engage with a bearing surface 64 of the lever 63 and rock said lever in a counter clockwise direction. This lever 63 is suitably connected to the shutter 28 which shutter passes between the opening 9 and the indicator segment. The rocking of the lever 63 also releases the main operating shaft 3, which, upon being rotated, disengages the projection 24' from the plate 14 in a manner somewhat similar to that shown in the main figures of the drawings.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

I claim:

1. In a cash register, the combination with the cash receptacle, of a hook mounted on said receptacle, a catch normally engaging said hook so as to lock the receptacle in closed position, means operated by the closing operation of the receptacle to move said catch and hook out of engagement with each other so as to completely unlock the receptacle, and means to throw said catch and hook into locking position.

2. In a cash register, the combination with the operating mechanism, and locking means therefor, of a cash receptacle, means to lock said receptacle in its closed position, means actuated by said receptacle to completely unlock the same, and means operatively connected with the receptacle to throw the locking means for the operating mechanism out of operation.

3. In a cash register, the combination with the operating mechanism and the cash receptacle, of locking means for the cash receptacle, means actuated by said receptacle to completely unlock the same, automatic means to hold said receptacle locking means in non-locking position, and means controlled by the operation of the operating mechanism to throw said holding means for the receptacle locking means out of operation.

4. In a cash register, the combination with the operating mechanism, and locking means therefor, of a cash receptacle, means to lock said receptacle in its closed position, means actuated by said receptacle to unlock the same, automatic means to hold said receptacle locking means in non-locking position, means operatively connected with the receptacle to throw the locking means for the operating mechanism out of operation, and means controlled by the operation of the operating mechanism to throw said holding means for the receptacle locking means out of operation.

5. In a cash register, the combination with the operating mechanism, of a cash receptacle, a hook mounted on said receptacle, a catch normally engaging said hook so as to lock the same, means operated by the receptacle to move said catch out of engagement with said hook so as to completely unlock the receptacle, and means controlled by the operation of the operating mechanism to throw said catch into locking position.

6. In a cash register, the combination with the operating mechanism, and locking means therefor, of a sliding till, a hook pivoted to said till, a catch normally engaging said hook so as to lock the same, means operated by the till to move said catch out of engagement with said hook, automatic means to lock said catch in its non-locking position, and means operatively connected with said catch to throw the locking means for the operating mechanism out of operation.

7. In a cash register, the combination with the operating mechanism, and locking means therefor, of a sliding till, a hook pivoted to said till, a catch normally engaging said hook so as to lock the same, means operated by the till to move said catch out of engagement with said hook, a rocking segment supporting said catch and adapted to be rocked thereby, automatic means to lock said segment in its rocked position, means operatively connected with said segment to unlock said operating mechanism, and means operated by the operating mechanism to unlock said segment.

8. In a cash register, the combination with the operating mechanism, locking means therefor, indicator, and cash receptacle, of locking means for said receptacle, means actuated by the receptacle to completely unlock the same, means operatively connected with the receptacle to throw the locking means for the operating mechanism out of operation, means actuated upon the unlocking operation of the cash receptacle to render the indication made on the indicator invisible and upon the closing operation of the receptacle to make the same visible.

9. In a cash register, the combination with the operating mechanism, locking means therefor, indicator, and a till, of means to lock said till in its closed position, means to unlock said till, automatic means to hold said locking means in non-locking position, means operatively connected with said till to throw the locking means for the operating mechanism out of operation, means actuated by the operating mechanism to throw said automatic holding means out of operation, and means actuated upon the opening operation of the till to render the indication made on the indicator invisible and upon the closing operation of the till to make the same visible.

10. In a cash register, the combination with the operating mechanism, locking means therefor, indicator, and cash receptacle, of locking means for said receptacle, means actuated by the receptacle to completely unlock the same, means operatively connected with the receptacle to throw the locking means for the operating mechanism out of operation, a shutter, means operatively connected with the cash receptacle to move the shutter in front of the indicator upon the opening operation of the cash receptacle and to remove the shutter from the indicator upon the closing operation of the receptacle.

11. In a cash register, the combination with the operating mechanism, indicator, till, and its locking and unlocking means, of a segment adapted to be rocked by the unlocking operation of the till and to be rocked backward by the operation of the operating mechanism and into its normal position by the closing operation of the till, of a shutter adapted to cover the indications of the indicator, a shutter operating rod engaged by said segment in such a way as to hold the shutter away from the indications on the indicator, bearing faces provided on said segment adapted to engage the rod when the segment is rocked by the unlocking operation of the till and by the operating operation and to hold the shutter in front of the indications on the indicator.

12. In a cash register, the combination with the operating mechanism, the indicator for indicating the amounts registered, and a till, of a shutter, adapted to render the indications of the indicator recognizable at close inspection only and to be moved upon the opening operation of the till in front of the said indications and upon completion of all operating movements of the machine away from the said indication.

13. The combination with a cash register the registering operation of which requires a plurality of successive manipulations, of an indicator for indicating the amounts registered, and a shutter adapted to render the indications of the indicator recognizable at close inspection only and to be moved upon one of the successive manipulations of the cash register in front of the said indications and upon another one of the manipulations of the cash register away from said indications.

14. In a cash register, the combination with the registering mechanism, the indicator for indicating the amounts registered, and a till, of a shutter of transparent material adapted to cover the indications of the indicator and to be moved upon the opening operation of the till in front of the said indications and requiring an operation of the registering mechanism to enable a movement away from the said indications.

15. In a cash register, the combination with the operating mechanism, and the till, of a signal operatively connected with said operating mechanism and till and adapted to be thrown into continual signaling position within a certain time after opening the till and to be prevented from being thrown into signaling position by the operation of the operating mechanism.

16. In a cash register, the combination with the operating mechanism, and the till, of an acoustic signal operatively connected with said operating mechanism and till and adapted to be thrown into continual signaling position within a certain time after opening the till and to be prevented from being thrown into signaling position by the operation of the operating mechanism.

17. In a cash register, the combination with a cash receptacle, of means adapted upon the closing movement of the receptacle to arrest said receptacle before its rearmost position is reached, the said arresting means and receptacle being moved out of operative position relatively to each other as the pressure required to close the receptacle is withdrawn, so that said receptacle can be moved into its rearmost position.

18. In a cash register, the combination with a till, of an abutment adapted upon the closing operation of the till to arrest the same before its rearmost position is reached, and means operative automatically when the till is released of its closing pressure to move said abutment and till out of operative position relatively to each other so that the till can be pushed into its rearmost position.

19. In a cash register, the combination with a till of an abutment for said till, a pivotal arm on said till adapted upon the closing operation of the till to strike against the abutment and upon the release of the till to be rocked away from the abutment, so that upon a further closing operation the till can be pushed into its rearmost position.

20. In a cash register, the combination with a till, of an abutment for said till, a pivotal arm on said till, means to rock said arm upon the closing operation of the till so as to strike against said abutment, said means being inoperative upon the forward movement of the till after the release of the same.

21. In a cash register, the combination with an operating mechanism, of a movable cash receptacle, a permanent indicating device, and actuating means therefor under the control of the operating mechanism and the cash receptacle and adapted to actuate the indicating device within a certain time after the movement of the receptacle and to be prevented from actuating the said indicating device by an operation of the operating mechanism.

22. In a cash register, the combination with an operating mechanism, of a movable cash receptacle, a counter, and actuating means therefor under the control of the operating mechanism and the cash receptacle and adapted to actuate the counter within a certain time after the movement of the receptacle and to be prevented from actuating the said counter by an operation of the operating mechanism.

23. In a cash register, the combination with a cash receptacle, of means for accounting for the amounts deposited in the cash receptacle, and means for indicating when the accounting means has not been operated within a certain time after the cash receptacle has been placed in condition to receive the amounts to be deposited.

24. In a cash register, the combination with a cash receptacle, of means for accounting for the amounts deposited in the cash receptacle, and an alarm with means for automatically sounding it when the accounting means has not been operated within a certain time after the cash receptacle has been placed in condition to receive the amounts to be deposited.

25. In a cash register, the combination with means for indicating various transactions, of means for partially concealing said indicating means so that it is visible at close inspection only, and means for imparting a relative movement between the indicating and concealing means so as to render the indicating visible at a distance.

26. In a cash register, the combination with means for indicating various transactions, of means for partially concealing said indicating means so that it is visible at close inspection only, and means for withdrawing the concealing means so as to render the indicating means visible at a distance.

27. In a cash register, the combination with a series of indicators, of a transparent shutter for partially concealing said indicators so that they are visible at close inspection only, and means for withdrawing said shutter so as to render the indicators visible at a distance.

28. In a cash register, the combination with an operating mechanism, of a cash receptacle, means for holding the latter in an inaccessible position, means controlled by the receptacle for disabling the holding means, and mechanism controlled by the operating mechanism for enabling the holding means.

29. In a cash register, the combination with an operating mechanism, of a movable cash receptacle, latching mechanism for holding the receptacle in a closed position, the said holding means being disabled by the movement of the receptacle, and means actuated by the operating mechanism for enabling the holding means.

30. The combination with a cash register the registering operation of which requires successive manipulations of separate elements thereof, of an indicator for indicating the amounts registered, and a shutter adapted to render the indication of the indicator recognizable at close inspection only and to be moved upon the manipulation of one of said elements of the cash register in front of the said indicators and requiring a manipulation of another of said elements to enable the movement of said shutter away from said indications.

31. In a cash register, the combination with a cash receptacle, of means for accounting for the amounts deposited in the cash receptacle, and means for indicating when the accounting means has been operated within a certain time after the cash receptacle has been placed in condition to receive the amounts to be deposited, said indicating means including automatic devices for controlling the extent of said time.

32. In a cash register, the combination with the operating mechanism, the indicator for indicating the amounts registered, and a till, of a shutter adapted to render the indications of the indicator recognizable at close inspection only and to be moved upon an initial operation of the till in front of the said indications and upon the final operation of the till away from the said indication, and means controlled by the main operating mechanism for rendering said till effective during the final operation of the latter to move said shutter away from said indication.

In testimony whereof I affix my signature, in presence of two witnesses.

WOLDEMAR REINHOLD HEINITZ.

Witnesses:
WILLIAM J. KONJETSUY,
PETER PAULER.